(12) United States Patent
Liu

(10) Patent No.: US 7,401,345 B2
(45) Date of Patent: Jul. 15, 2008

(54) DIGITAL AUDIO SIGNAL PLAYER

(75) Inventor: Shen-Chi Liu, Tainan (TW)

(73) Assignee: Hanpin Electron Co., Ltd., Tainan County (TW)

( * ) Notice: Subject to any disclaimer, the term of this patent is extended or adjusted under 35 U.S.C. 154(b) by 411 days.

(21) Appl. No.: 11/312,754

(22) Filed: Dec. 21, 2005

(65) Prior Publication Data

US 2007/0143772 A1   Jun. 21, 2007

(51) Int. Cl.
    *G11B 17/028* (2006.01)
(52) U.S. Cl. ...................................... 720/695
(58) Field of Classification Search .................. 720/695
    See application file for complete search history.

(56) References Cited

U.S. PATENT DOCUMENTS 4,825,314 A * 4/1989 Maekawa et al. ........ 360/99.08
5,101,398 A * 3/1992 Inoue et al. .................. 720/667
6,680,896 B2 * 1/2004 Shiwa ........................ 720/695
6,877,164 B2 * 4/2005 Lee ............................ 720/695

\* cited by examiner

*Primary Examiner*—Joseph Feild
*Assistant Examiner*—Mark Blouin
(74) *Attorney, Agent, or Firm*—Rosenberg, Klein & Lee

(57) ABSTRACT

An audio signal player includes a turntable unit, a conductive touch-control plate on top of the turntable unit, a round disk, a round disk central shaft made of electricity-conductive materials and joined to the touch-control plate, a reflective-type photoelectric interrupter secured in the touch-control plate for finding out rotational speed and direction of the round disk, and a photoelectric interrupter in a lower end of the turntable unit for finding out rotational speed and direction of the turntable unit; when the round disk is manually rotated, the audio signal player will produce scratch sound effects according to the rotational speed and direction of the round disk; the user is allowed to touch the touch-control plate so as to produce a touch signal, thus making the audio signal player produce a particular scratch sound effect according to the touch signal.

1 Claim, 17 Drawing Sheets

DIGITAL AUDIO SIGNAL PLAYER

BACKGROUND OF THE INVENTION

1. Field of the Invention

The present invention relates to a method for making a multi-color melamine container, more particularly one, which is convenient to use, and has smaller size and more functions.

2. Brief Description of the Prior Art

In order to help increase hot and exciting atmosphere in a concert or a party such as is held in a PUB or a dancing hall, the DJ usually makes the music played with scratch sound effects by means of manually moving the analogue vinyl record positioned on the turntable at changing speeds and in alternate directions. As soon as the DJ stops moving the record with his hands, the record player will start playing the record in the normal way again. However, a single analogue vinyl record has very limited capacity to store music in, and a DJ has to prepare a lot of vinyl records in every event, and the records are likely to cause the DJ inconvenience due to the large size and heavy weight. Moreover, conventional vinyl records are prone to be damaged when they are manually moved relative to the turntable. CD/MP3 records have larger capacity, and are smaller in size and more convenient to use than conventional vinyl records.

Therefore, various types of audio signal players are developed for DJ to play CD/MP3 records and produce scratch sound effects.

Referring to FIG. 15, a currently available digital audio signal player 3 includes an actuating device 31, a turntable 32, a grating 33, and an optical sensor 34. The actuating device 31 has an output shaft 311. The turntable 32 is secured around an upper end of the output shaft 311 while the grating 33 is secured around a lower end of the output shaft 311; thus, the turntable 32 and the grating 33 will rotate at the same speed and in the same direction when the output shaft 311 rotates. The optical sensor 34 is used for detecting movement of the grating 33. When the user is manually rotating a round disk 321 positioned on the turntable 32 to produce various scratch sound effects, he would possibly change the speed of rotation of the turntable 32. Because of the optical sensor 34 and the grating 33, the speed and direction of rotation of the turntable 32 will be found out when the user is manually rotating the round disk 321.

Referring to FIG. 16, another currently available digital audio signal player 4 includes an actuating device 41, a turntable 42, a magnet seat 43, an induced magnet 431, and a magnetic sensing plate 432. The actuating device 41 has an output shaft 411. The turntable 42 is secured around an upper end of the output shaft 411, and the magnet seat 43 and the turntable 42 will rotate at the same speed and in the same direction when the output shaft 411 rotates. The induced magnet 431 is secured on a bottom side of the magnet seat 43. The magnetic sensing plate 432 is used for detecting movement of the induced magnet 431. When the user is manually rotating a round disk 421 positioned on the turntable 42 to produce various scratch sound effects, he would possibly change the speed of rotation of the turntable 42. Because of the magnetic sensing plate 432 and the induced magnet 431, the speed of rotation of the turntable 42 will be found out.

From the above description, it can be seen that when the above-mentioned digital audio signal players are used, the users are allowed to manually rotate the round disks on the turntables so as to produce certain scratch sound effects. However, such method of producing scratch sound effects has its limitation; the users can only produce some certain kinds of scratch sound effects, and he isn't allowed to use other methods to add other scratch sound effects to the current ones while manually rotating the round disks on the turntables. Furthermore, each of the digital audio signal players has to be equipped with a pick-up for reading signals of the round disk, causing increase to the size of the audio signal players. Consequently, the audio signal players are relatively big.

Referring to FIG. 17, yet another currently available digital audio signal player 5 includes a hollow housing part 51, a playing device 52, a turntable mechanism 53, an actuating mechanism 54, and a signal reading mechanism 55. The playing device 52 is used for playing a CD. The turntable mechanism 55 includes first and second turntables 531, 532 on an upper side of the hollow housing part 51, and a coupling plate 533 sandwiched between the first and the second turntables 531, 532. The actuating mechanism 54 includes a rotary shaft 541, and an electromagnetic rotating seat 542; the rotary shaft 541 projects from the upper side of the hollow housing part 51, and is connected to the turntable mechanism 53 such that the turntable mechanism 53 and the rotary shaft 541 can rotate at the same speed and in the same direction; the electromagnetic rotating seat 542 is used for making the turntable mechanism 53 rotate. The signal reading mechanism 55 includes first and second light blocking plates 551, 553, first and second photoelectric interrupters 552, and 554; the first light blocking plate 551 will rotate at the same speed and in the same direction as the first turntable 531 while the second light blocking plate 553 will rotate at the same speed and in the same direction as the rotary shaft 541; the first photoelectric interrupter 552 will read signals of the first light blocking plate 551 while the second photoelectric interrupter 554 will read signals of the second light blocking plate 553. Therefore, the playing device 52 will produce normal audio effects when the turntables 531, 532 rotate in the same direction and at the same speed. And, the playing device 52 will produce scratch sound effects when the first and the second turntables 531, 532 rotate in different directions or at different speeds.

The above audio signal player doesn't have to be further equipped with a pick-up because it has the first and the second photoelectric interrupters and light blocking plates for finding out the rotational speed and direction of the rotary shaft and the first turntable. However, the user still isn't allowed to produce scratch sound effects with another method except manually rotating the turntables. Furthermore, the first and the second light blocking plates will cause increase to the thickness of the audio signal player. Consequently, the audio signal player occupies much space, and is inconvenient to use.

SUMMARY OF THE INVENTION

It is a main object of the invention to provide an improvement on a digital audio signal player to overcome the above-mentioned problems. The digital audio signal player includes a turntable unit, an actuating unit, a magnet seat secured on a bottom side of the turntable unit, an upright grating secured on the magnet seat, a photoelectric interrupter for finding out rotational speed and direction of the turntable unit, a round disk central shaft inserted in an output shaft of the actuating unit, a touch-control plate securely joined to an upper end of the round disk central shaft, a reflective-type photoelectric interrupter secured inside the touch-control plate, a rotating dustproof seat positioned under the touch-control plate, a round disk to be manually rotated for producing scratch sound effects, and a reflective-type plate-shaped grating; the round disk central shaft includes an inner part made of electricity-conductive materials, and an insulating outer part wrapped around the conductive inner part; the round disk is connected to the rotating dustproof seat so as to rotate together; the round disk pad is pressed between the round disk and the turntable unit; when the touch-control plate is touched to produce a touch signal, the audio signal player will produce a particular scratch sound effect according to the touch signal. The reflective-type plate-shaped grating is secured in the rotating dustproof seat, and the reflective-type photoelectric interrupter is faced with the reflective-type plate-shaped grating for finding out rotational speed and direction of the round disk. Therefore, the digital audio signal player is relatively thin, and occupies less space.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
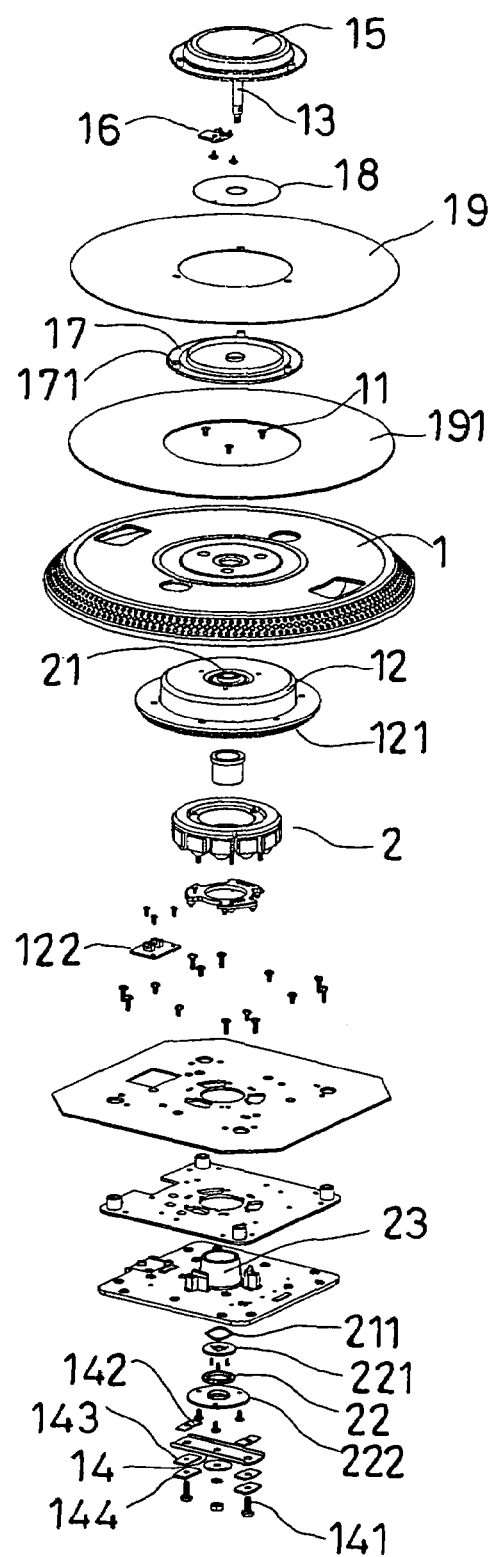
FIG. 1 is an exploded perspective view of the digital audio signal player in the present invention.
Figure 2:
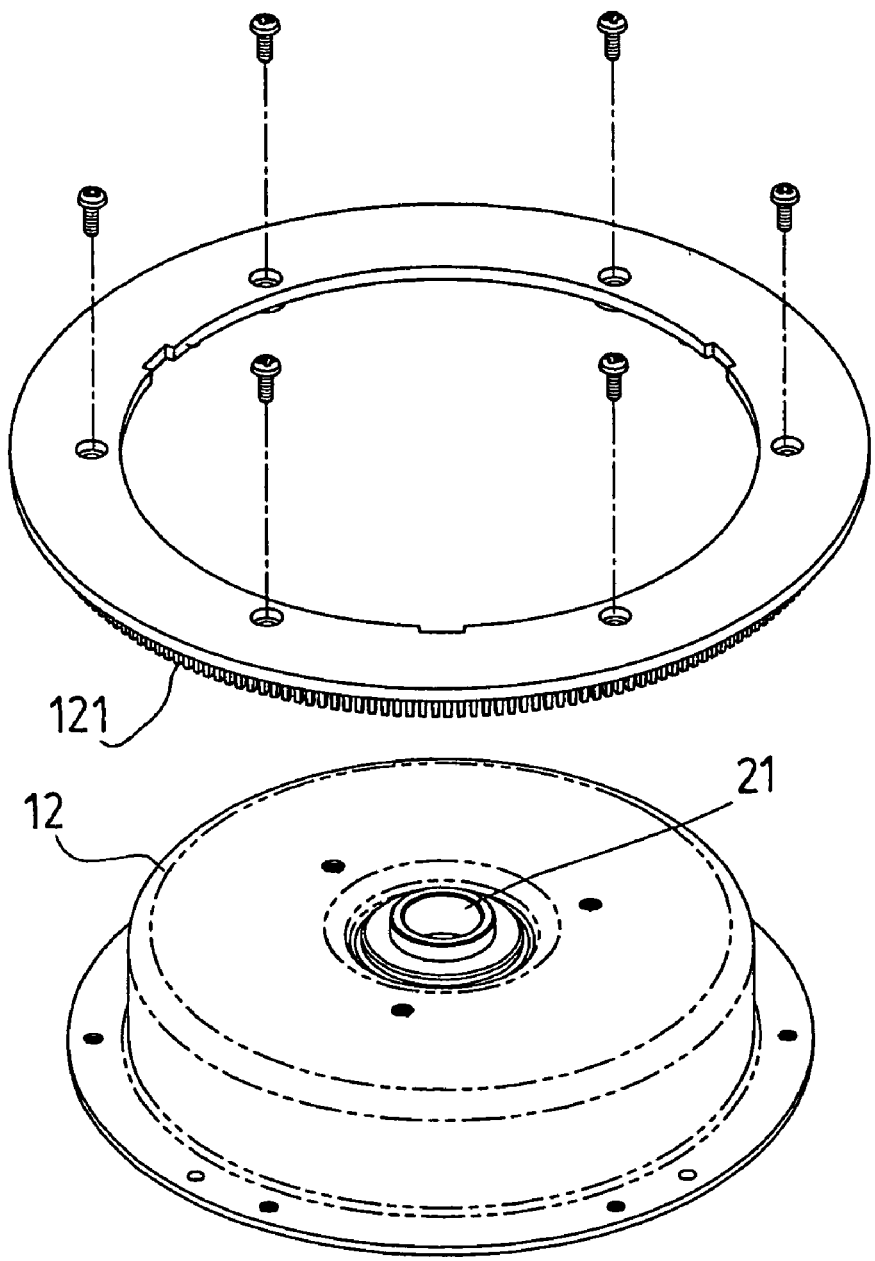
FIG. 2 is a partial exploded sectional view of the invention (1)
Figure 3:
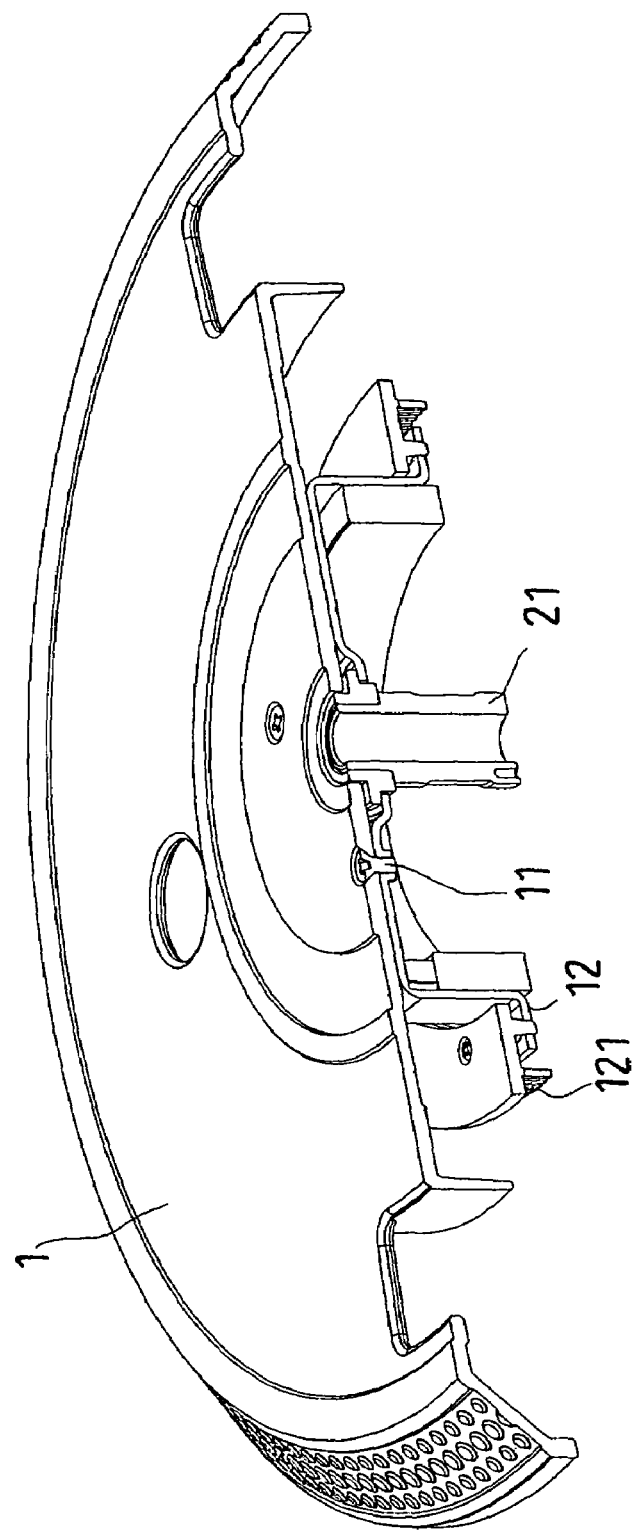
FIG. 3 is a partial sectional view of the invention (1)
Figure 4:
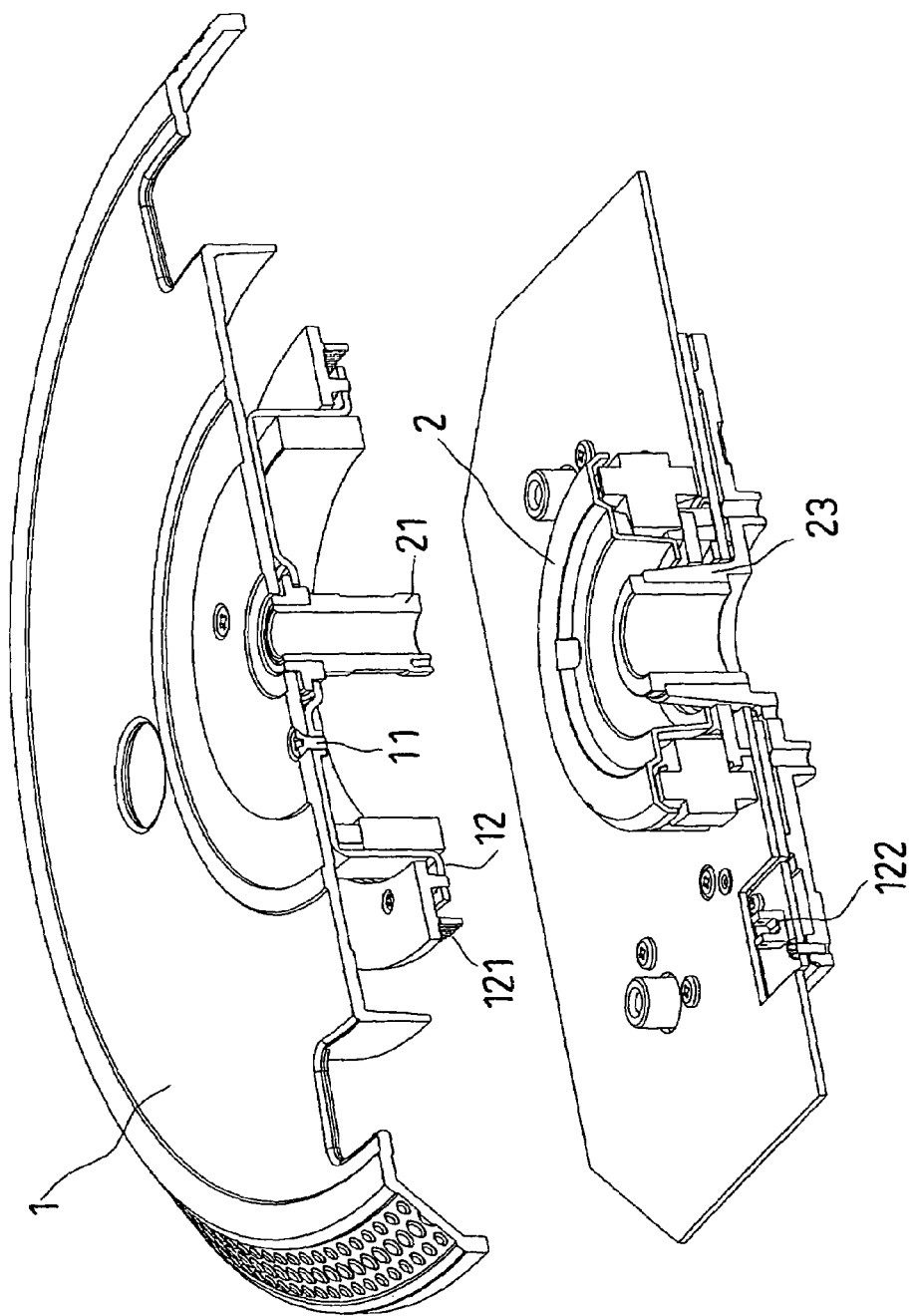
FIG. 4 is a partial exploded sectional view of the invention (2)
Figure 5:
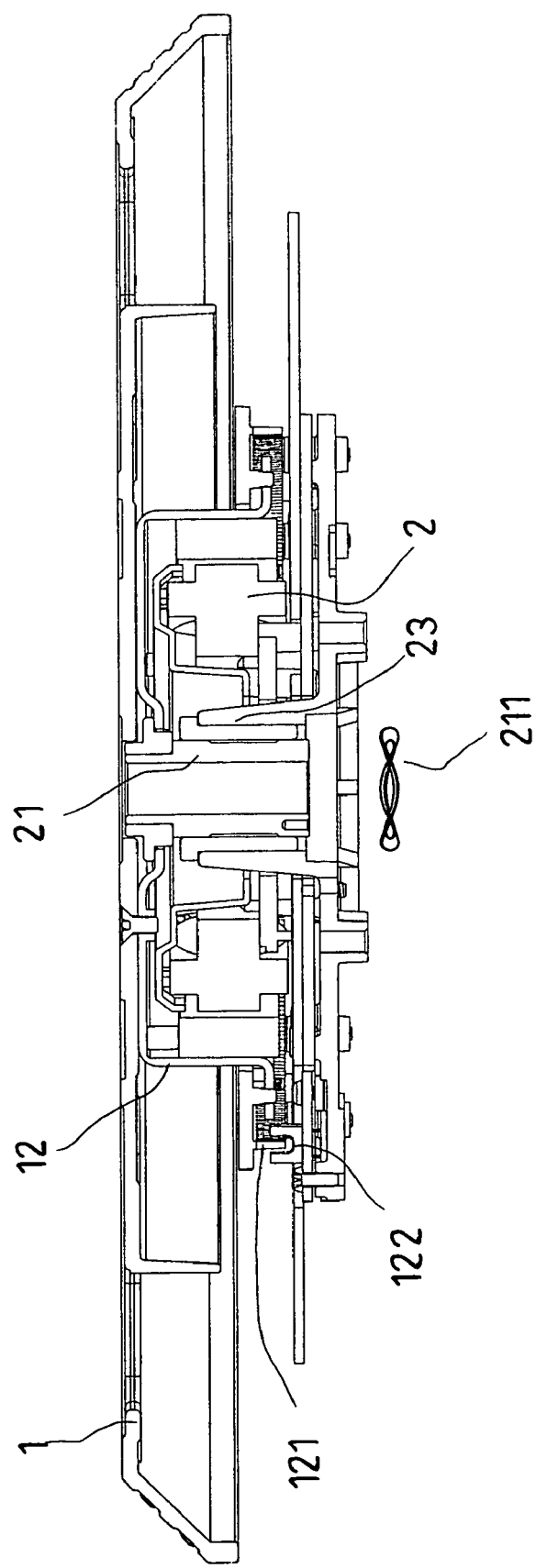
FIG. 5 is a partial lateral sectional view of the invention (1)
Figure 6:
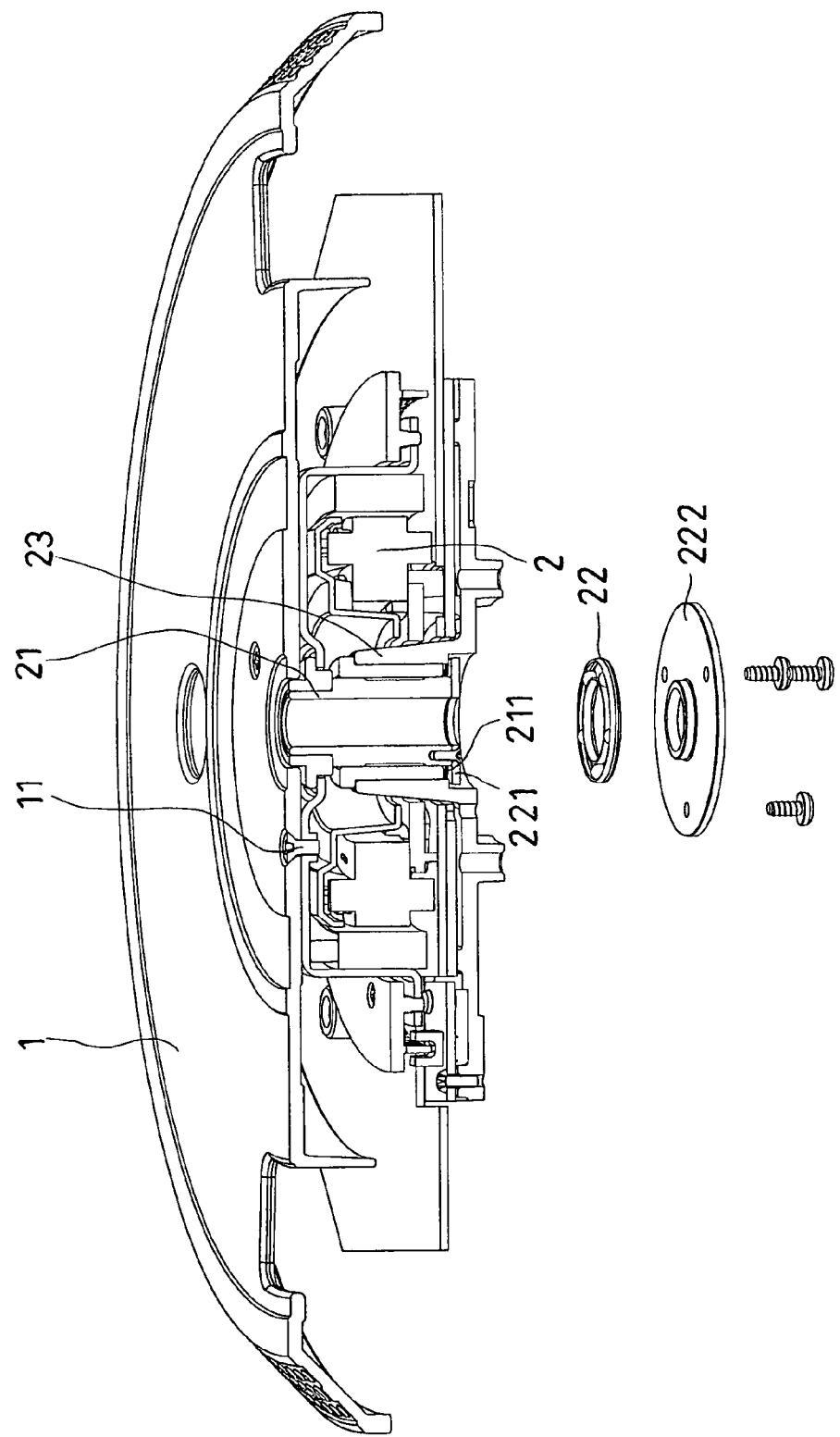
FIG. 6 is a partial exploded sectional view of the invention (3)
Figure 7:
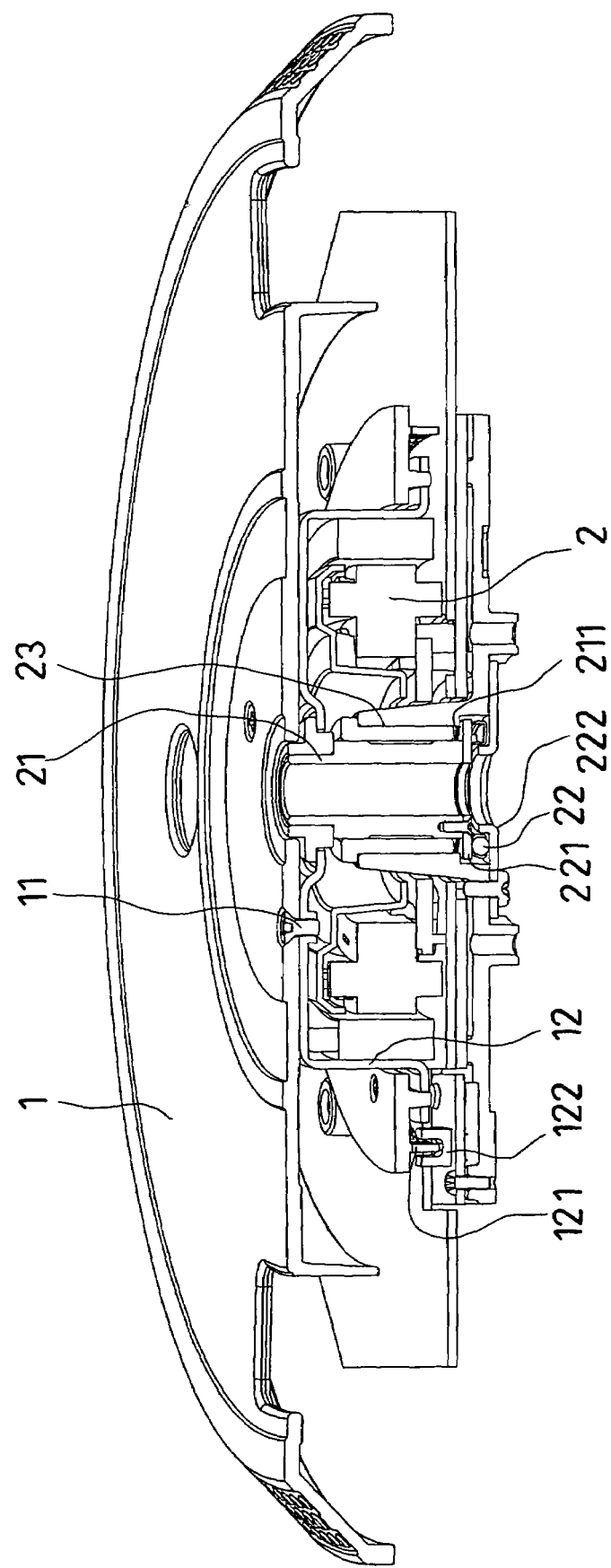
FIG. 7 is a partial sectional view of the present invention (2)
Figure 8:
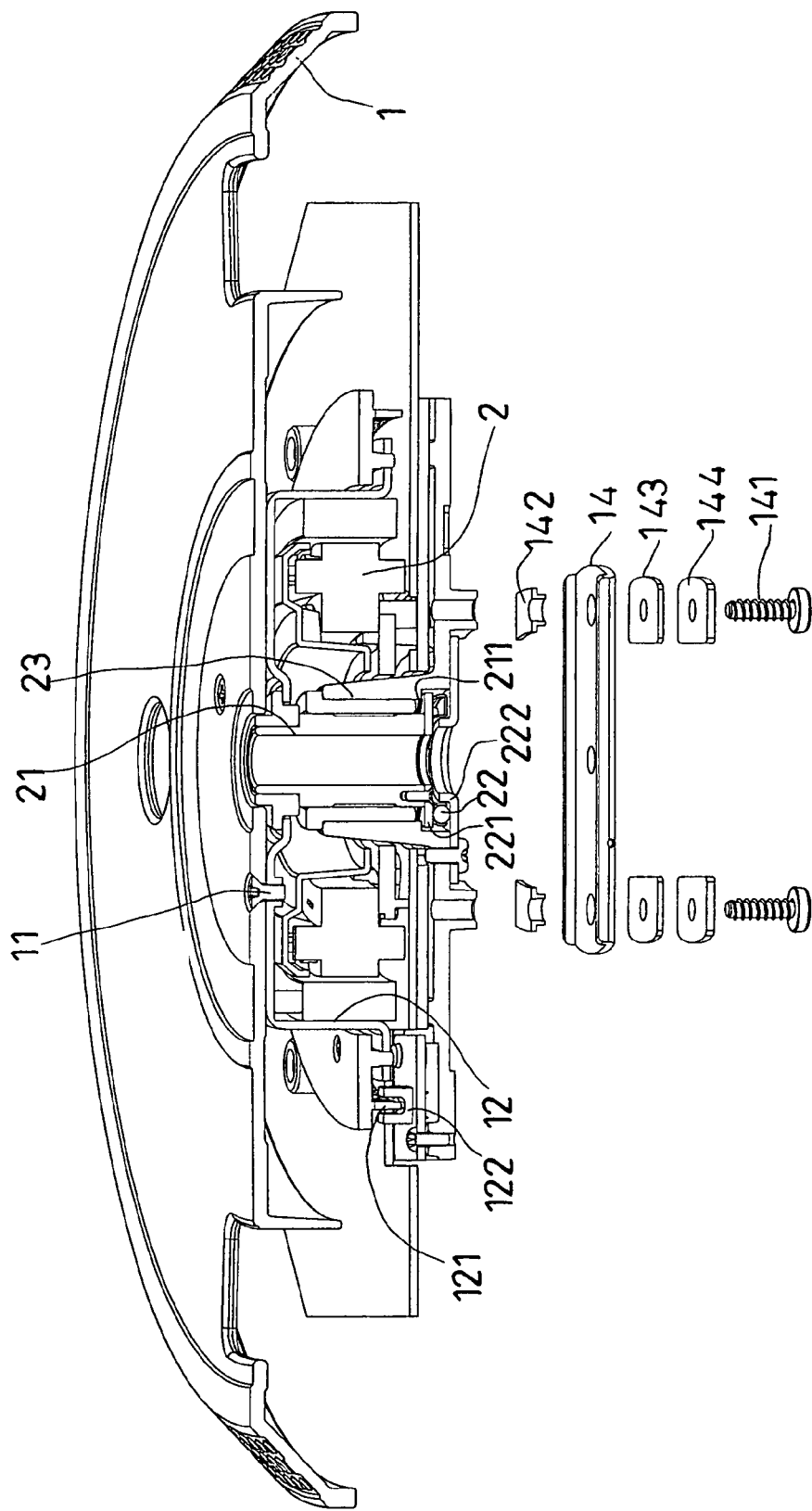
FIG. 8 is a partial exploded sectional view of the invention (4)
Figure 9:
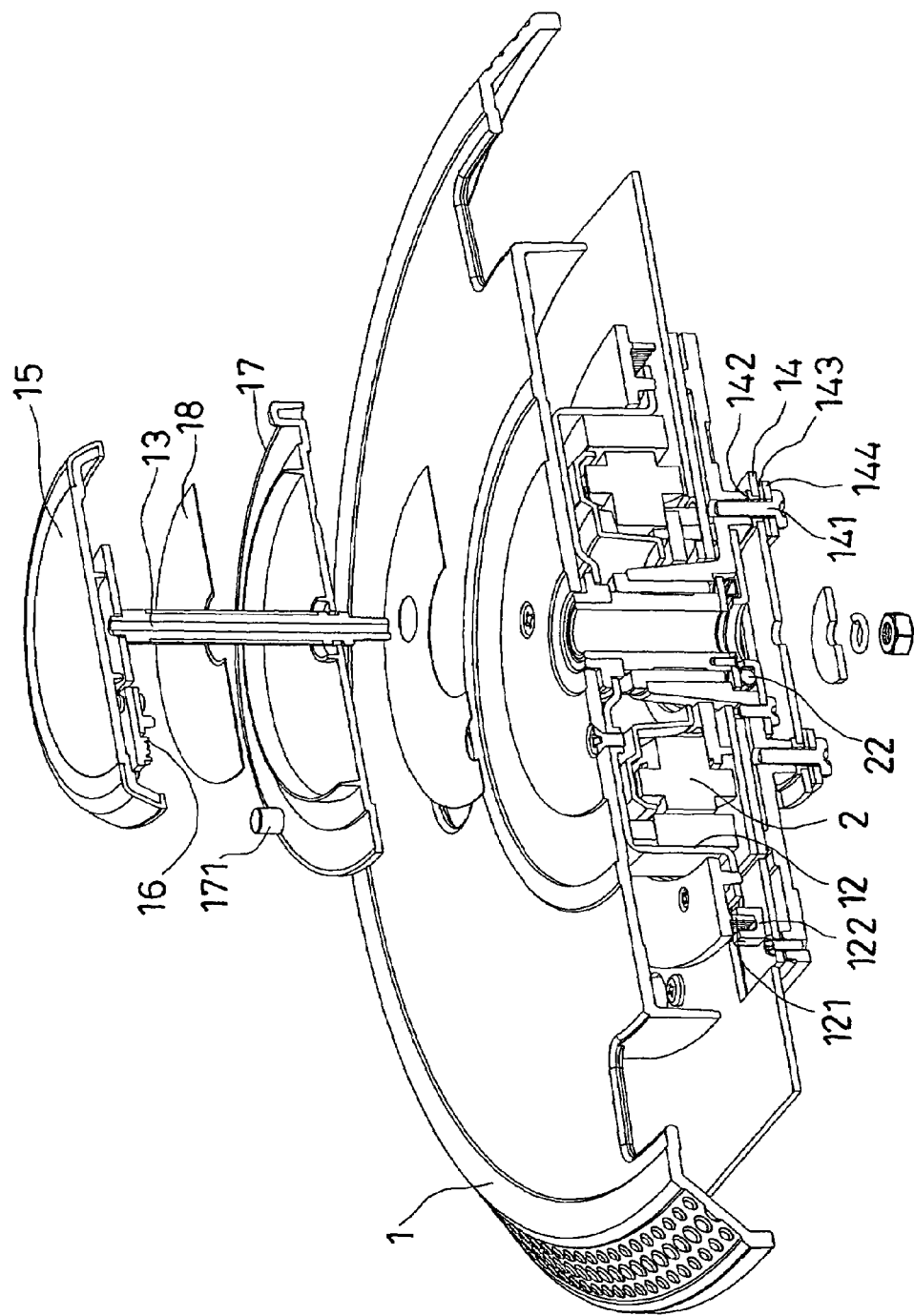
FIG. 9 is a partial exploded sectional view of the invention (5)
Figure 10:
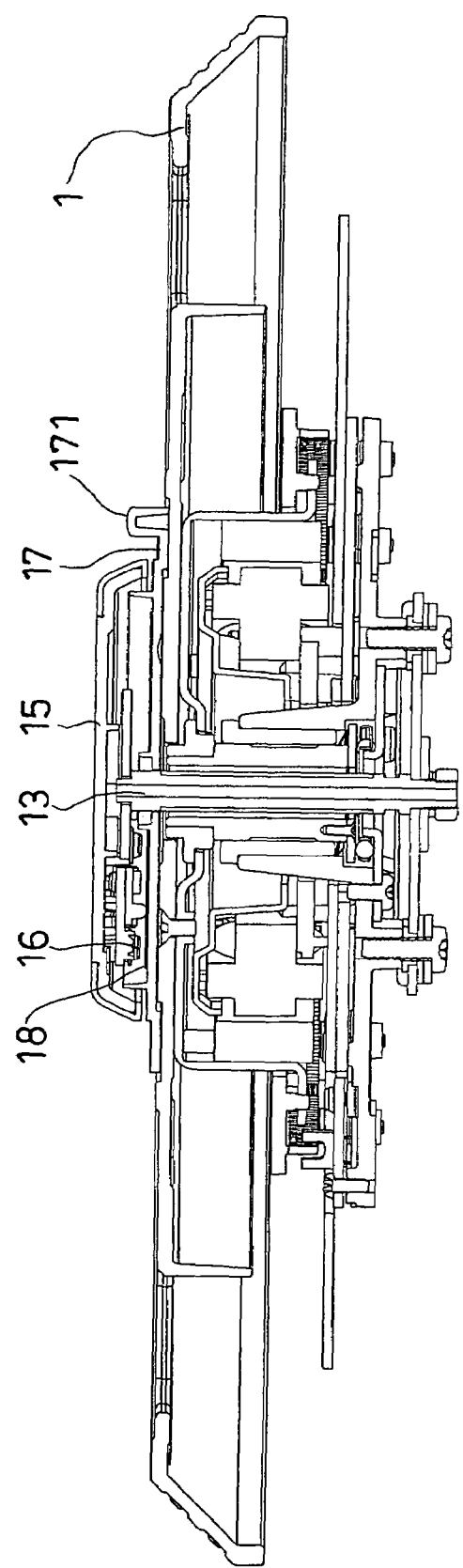
FIG. 10 is a partial lateral sectional view of the invention (2)
Figure 11:
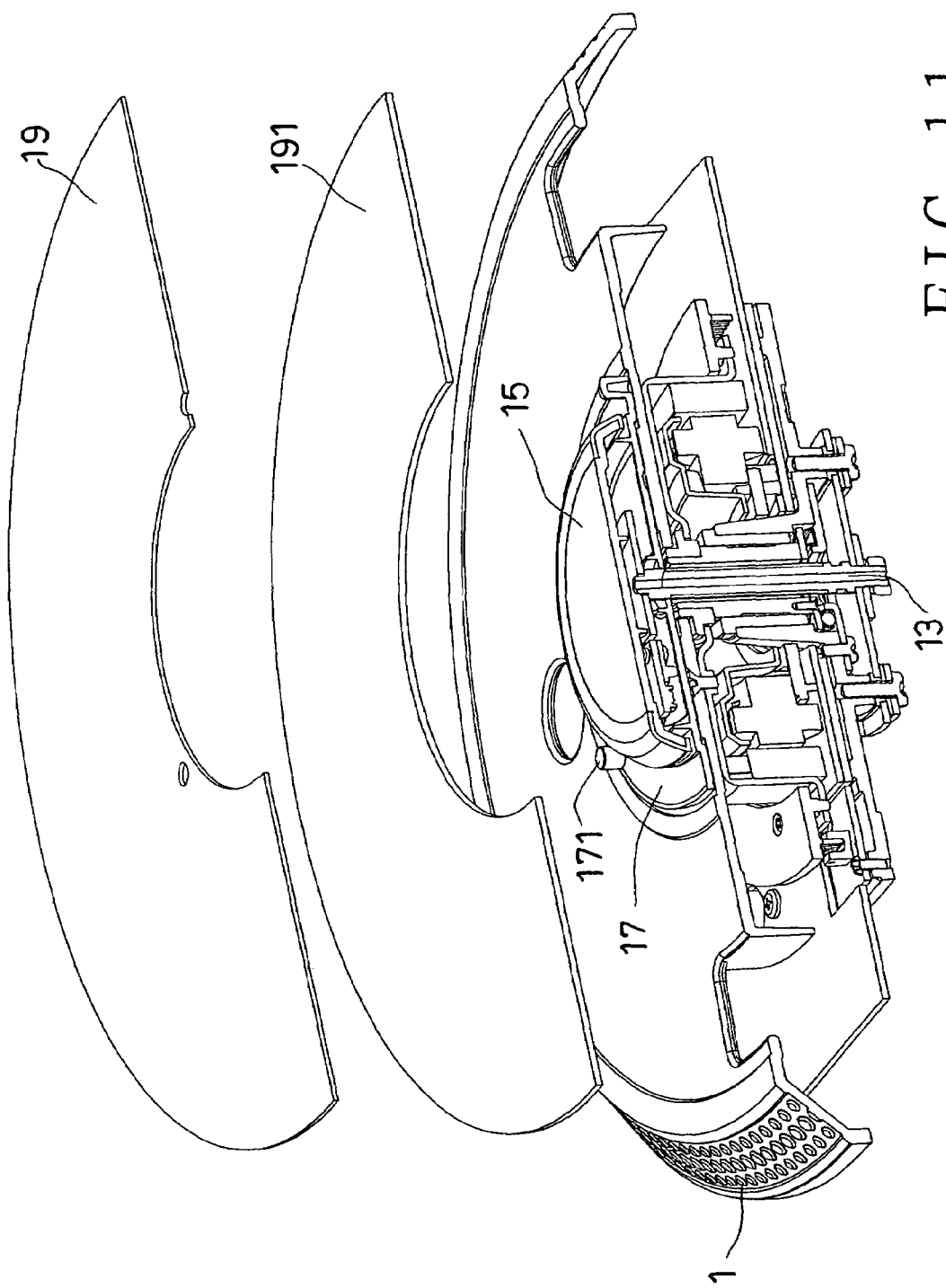
FIG. 11 is a partial exploded sectional view of the invention (6)
Figure 12:
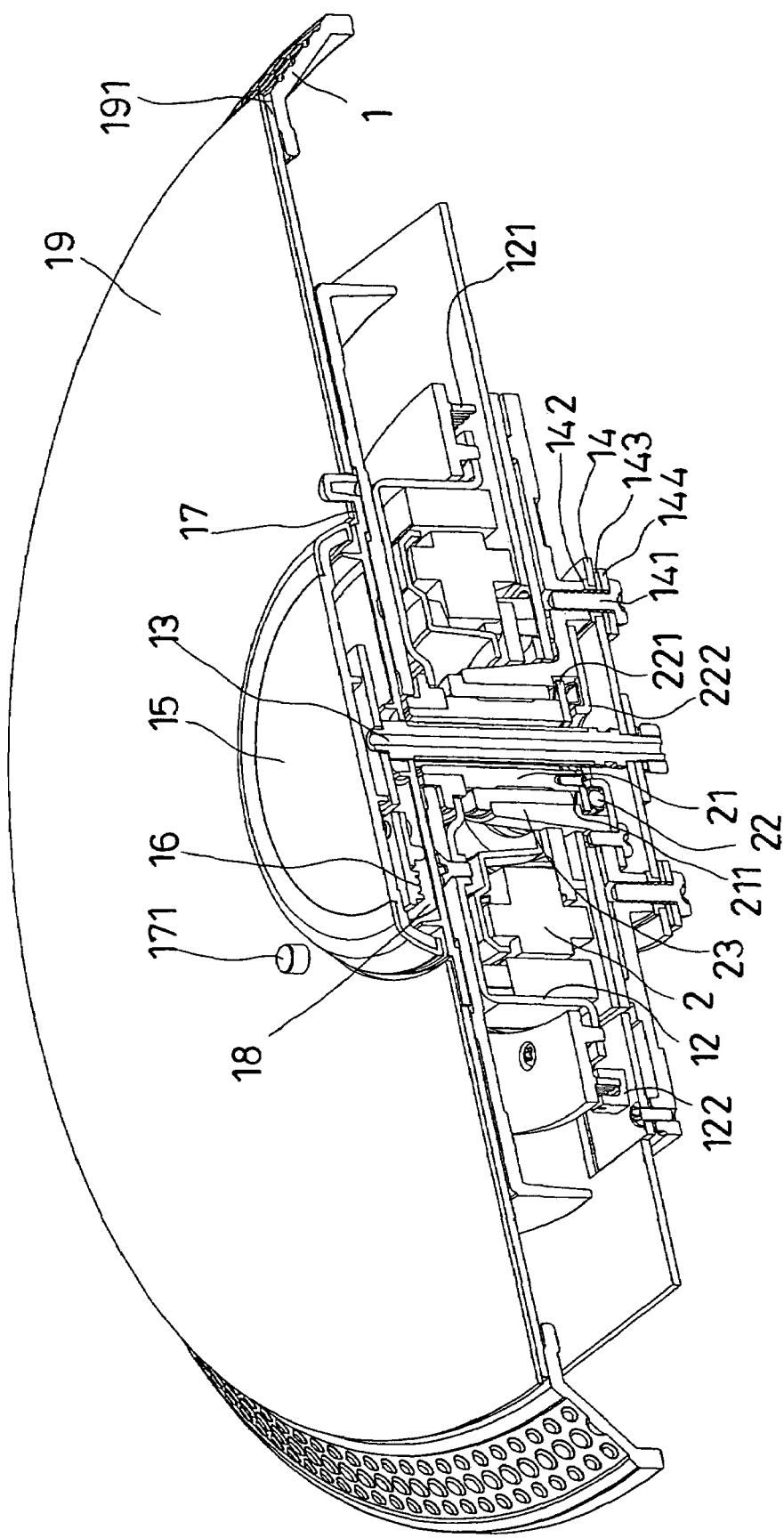
FIG. 12 is a perspective sectional view of the present invention.
Figure 13:
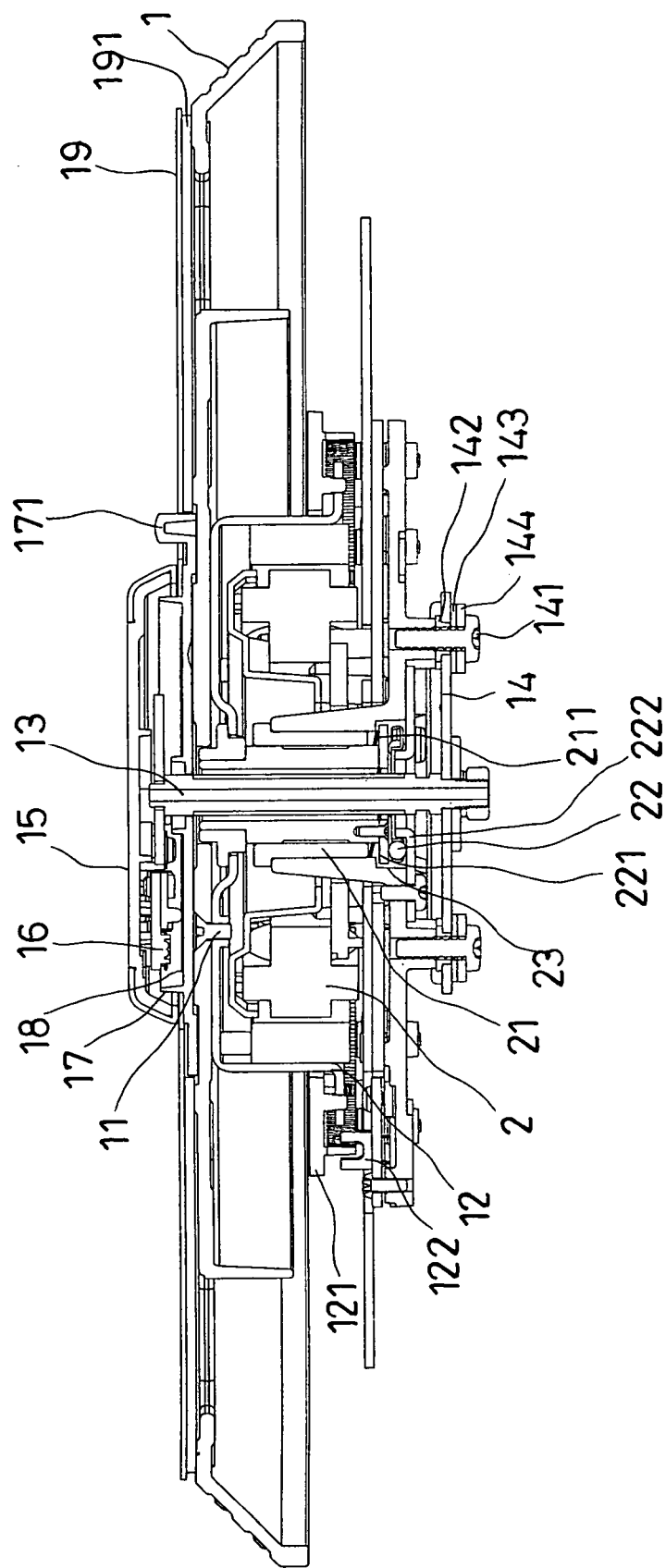
FIG. 13 is a lateral sectional view of the present invention.

Referring to FIGS. 2 to 13, a preferred embodiment of a digital audio signal player in the present invention includes:

a turntable unit 1;

an actuating unit 2 having an output shaft 21; an upper ringed pad 221 is securely joined to a lower end of the output shaft 21;

a magnet seat 12; the magnet seat 12 is secured on a bottom side of the turntable unit 1 by means of threaded fixing elements 11 such that the magnet seat 12 and the turntable unit 1 can't rotate relative to each other; the magnet seat 12 is securely joined to the output shaft 21 of the actuating unit 2 at a center thereof;

an upright grating 121 on a lower edge of the magnet seat 12;

a photoelectric interrupter 122 for use with the upright grating 121;

a motor seat formed with an axle hole 23;

a buffer pad 211 positioned between the output shaft 21 and the upper ringed pad 221;

a lower ringed pad 222 secured in a lower end of the axle hole 23;

a ball bearing 22 positioned between the upper and the lower ringed pads 221 and 222; the ball bearing 22 is supported on the lower ringed pad 222 for allowing the output shaft 21 and the upper ringed pad 221 to rotate smoothly thereon;

a motor base 14; threaded connecting elements 141 are passed through two ends of the motor base 14 to secure the motor base 14 in position; the motor base 14 is insulated by means of insulating pads 142, insulating plates 143, and pressing and fixing plates 144;

a round disk 19; the round disk 19 has a round disk pad 191 under it, which is pressed between the round disk 19 and the turntable unit 1 so that the round disk 19, the round disk pad 191, and the turntable unit 1 can turn together;

a round disk central shaft 13 having an inner part made of electricity-conductive materials, and an insulating outer part wrapped around the electricity-conductive inner part; the round disk central shaft 13 is inserted in the output shaft 21, and securely joined to the motor base 14 at a lower end thereof;

a touch-control plate 15 made of electricity-conductive materials; the round disk central shaft 13 is securely joined to the touch-control plate 15 at an upper end thereof;

a reflective-type photoelectric interrupter 16 secured inside the touch-control plate 15;

a rotating dustproof seat 17 positioned under the touch-control plate 15; the rotating dustproof seat 17 has several connecting pins 171 thereon, and it is connected to the round disk 19 at the connecting pins 171; and a reflective-type plate-shaped grating 18 secured in the rotating dustproof seat 17 and faced with the reflective-type photoelectric interrupter 16.

Figure 14:
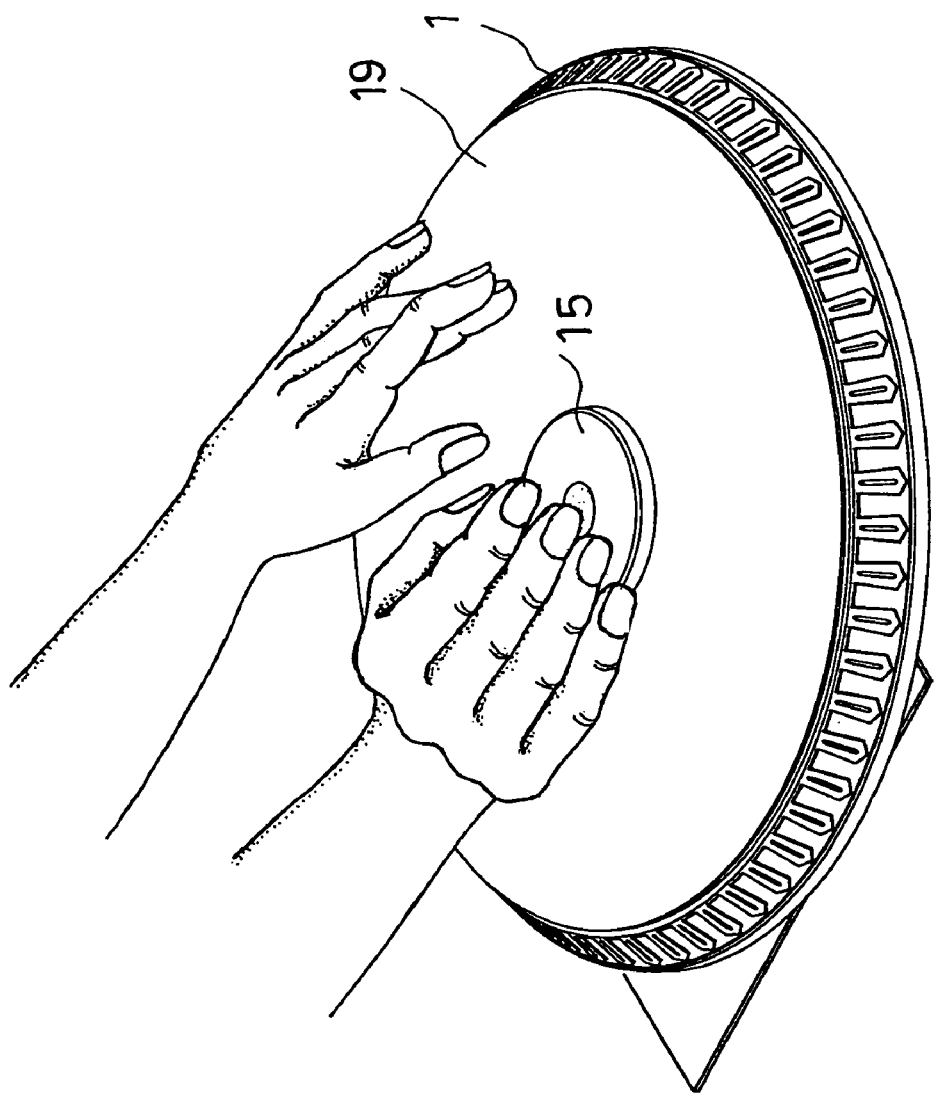
FIG. 14 is a view of the present invention in use.
Figure 15:
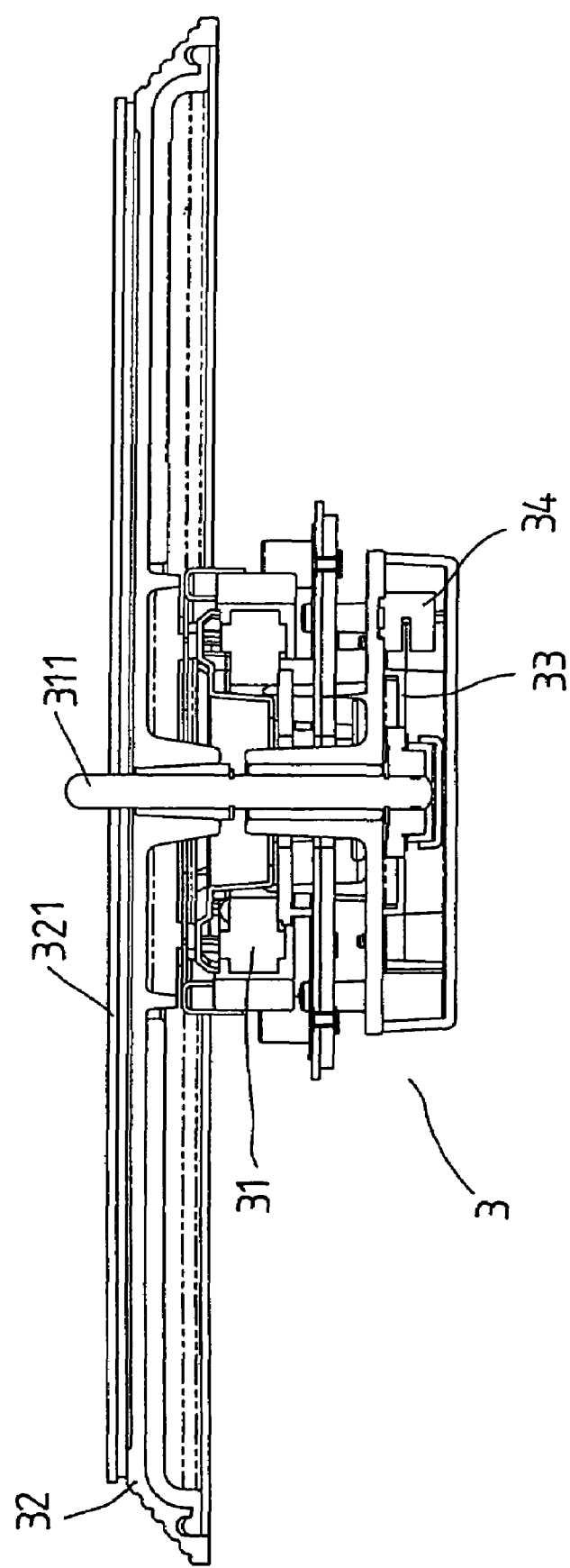
FIG. 15 is a lateral sectional view of the first prior art.
Figure 16:
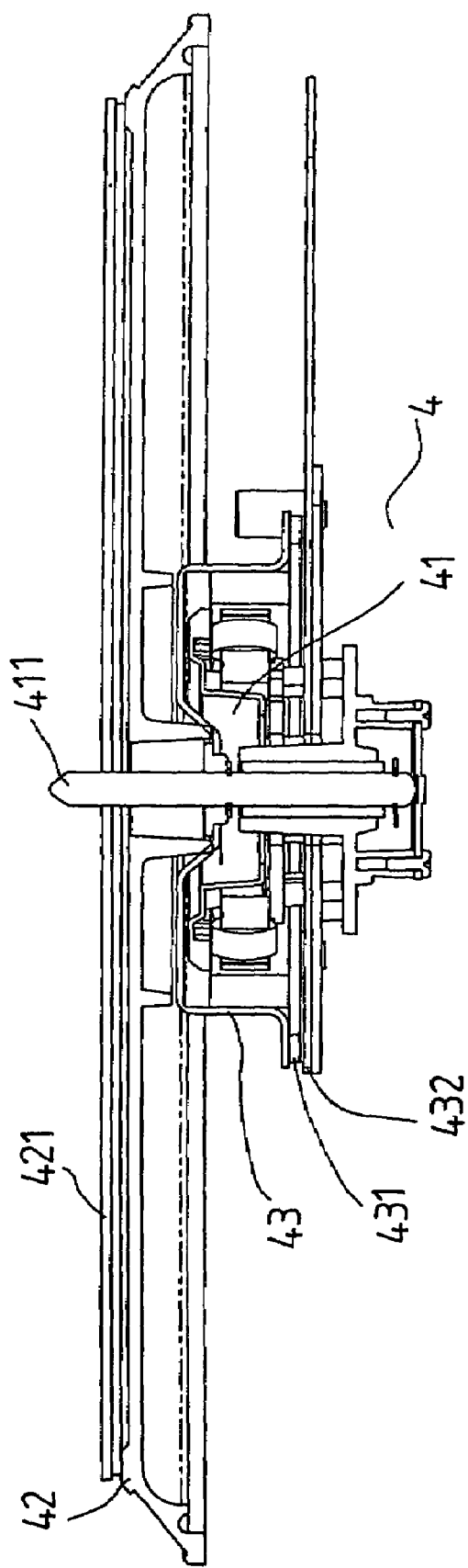
FIG. 16 is a lateral sectional view of the second prior art.
Figure 17:
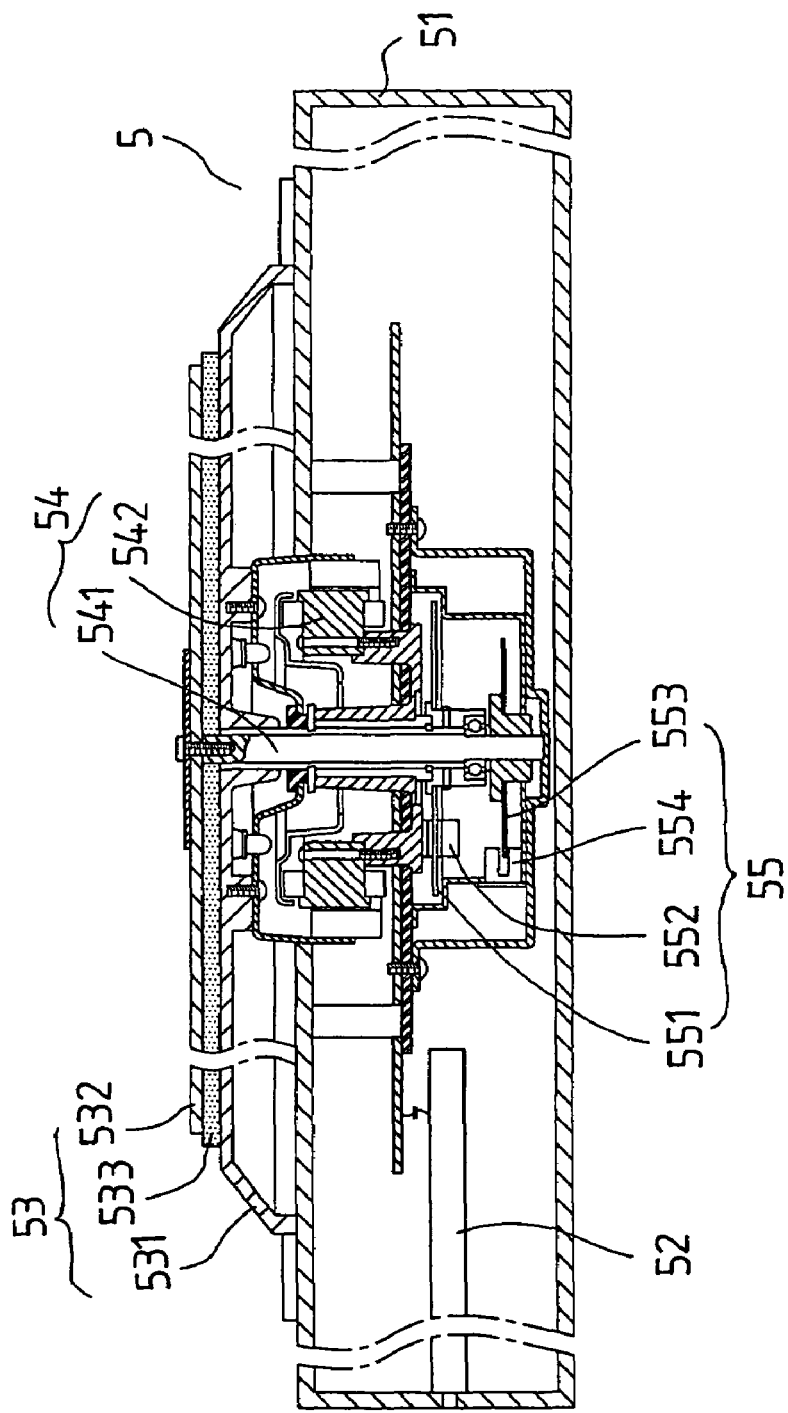
FIG. 17 is a lateral sectional view of the third prior art.

Therefore, when the output shaft 21 of the actuating unit 2 is making the turntable unit 1 rotate together with it, and the user pressing and rotating the round disk 19 manually, the round disk 19 will make the rotating dustproof seat 17 rotate together with it, and the rotational speed and direction of the round disk 19 will be found out with the help of the reflective-type photoelectric interrupter 16, which will read the reflective-type plate-shaped grating 18 at the same time; thus, a certain scratch sound effect will be produced according to the rotational speed and direction of the round disk 19. At the same time, the upright grating 121 and the photoelectric interrupter 122 will measure change of the speed of the turntable unit 1, and make the speed of the turntable unit 1 kept at a constant one accordingly. Referring to FIG. 14, while manually rotating the round disk 19, the user is also allowed to touch the touch-control plate 15 for a touch signal to be transmitted into the present digital audio signal player through the electricity-conductive touch-control plate 15 and the electricity-conductive inner part of the round disk central shaft 13; thus, the digital audio signal player plays out a particular scratch sound effect according to the touch signal. Furthermore, because of the existence of the ball bearing 22, which is positioned between the output shaft 21 of the actuating unit 2 and the lower end of the axle hole 23 of the motor seat, the output shaft 21 will start to make the turntable unit 1 rotate at the normal speed and in the normal direction again immediately after the user stops pressing the round disk 19, without any delay.

From the above description, it can be easily seen that the digital audio signal player of the present invention has the following advantages over the conventional ones:

1. The digital audio signal player has more functions; besides allowing the user to produce scratch sound effects through manually rotating the round disk, the digital audio signal player allows the user to produce additional scratch sound effects through touching the touch-control plate to produce touch signals, which will be transmitted into an internal circuit of the audio signal player through the electricity-conductive inner part of the round disk central shaft.

2. Because of the ball bearing positioned between the output shaft of the actuating unit and the lower end of the axle hole of the motor seat, the original rotational speed and direction of the turntable unit will be recovered immediately after the user stops pressing the round disk. Therefore, there won't be any delay, and the digital audio signal player will play music more smoothly.

3. Because the upright grating is secured on the magnet seat secured on the bottom side of the turntable unit, and because the reflective-type photoelectric interrupter is secured in the touch-control plate to sense the reflective-type plate-shaped grating secured in the rotating dustproof seat, the digital audio signal player is relatively compact, coming in a smaller height and size than the prior arts.

4. Because the magnet seat is secured on the bottom of the turntable unit by means of threaded fixing elements, it will certainly rotate in the same speed and in the same direction as the turntable unit. In other words, it isn't possible for the magnet seat to slide on the turntable unit.

5. Dust is preventing from entering the space between the touch-control plate and the rotating dustproof seat right above the turntable unit together to dirty the reflective-type plate-shaped grating, which is secured inside the rotating dustproof seat and rotary together with the round disk.

6. The user is allowed to replace the round disk and the round disk pad without having to remove any other part of the present digital audio signal player. Therefore, the present invention is convenient to use.

What is claimed is:

1. A digital audio signal player, comprising
a turntable unit;
an actuating unit having an output shaft; the output shaft having an upper ringed pad securely joined to a lower end thereof;
a magnet seat; the magnet seat being secured on a bottom side of the turntable unit so as not to rotate relative to the turntable unit; the magnet seat being securely joined to the output shaft of the actuating unit at a center thereof;
an upright grating on a lower edge of the magnet seat;
a photoelectric interrupter for use with the upright grating;
a motor seat formed with an axle hole;
a lower ringed pad secured in a lower end of the axle hole of the motor seat;
a ball bearing positioned between the upper and the lower ringed pads; the ball bearing being supported on the lower ringed pad for allowing the output shaft of the actuating unit and the upper ringed pad to rotate smoothly thereon;
a round disk central shaft inserted in the output shaft; the round disk central shaft including an inner part made of electricity-conductive materials, and an insulating outer part wrapped around the electricity-conductive inner part;
a touch-control plate; the round disk central shaft being securely joined to the touch-control plate at an upper end thereof;
a reflective-type photoelectric interrupter secured inside the touch-control plate;
a rotating dustproof seat positioned under the touch-control plate; the rotating dustproof seat having a plurality of connecting pins thereon;
a round disk; the round disk being connected to the connecting pins of the rotating dustproof seat so as to rotate together;
a round disk pad pressed between the round disk and the turntable unit; and
a reflective-type plate-shaped grating secured in the rotating dustproof seat and faced with the reflective-type photoelectric interrupter.

* * * * *